US012651429B2

(12) United States Patent
Peng et al.

(10) Patent No.: US 12,651,429 B2
(45) Date of Patent: Jun. 9, 2026

(54) METHOD FOR DETERMINING AN IMAGE DESCRIPTOR, ENCODING PIPELINE, AND VISUAL PLACE RECOGNITION METHOD

(71) Applicants: AUMOVIO Germany GmbH, Frankfurt am Main (DE); NANYANG TECHNOLOGICAL UNIVERSITY, Singapore (SG)

(72) Inventors: Guohao Peng, Singapore (SG); Danwei Wang, Singapore (SG); Jun Zhang, Singapore (SG); Heshan Li, Singapore (SG)

(73) Assignees: AUMOVIO Germany GmbH, Frankfurt am Main (DE); NANYANG TECHNOLOGICAL UNIVERSITY, Singapore (SG)

( * ) Notice: Subject to any disclaimer, the term of this patent is extended or adjusted under 35 U.S.C. 154(b) by 333 days.

(21) Appl. No.: 18/567,860

(22) PCT Filed: Jun. 7, 2022

(86) PCT No.: PCT/EP2022/065411
§ 371 (c)(1),
(2) Date: Dec. 7, 2023

(87) PCT Pub. No.: WO2022/258624
PCT Pub. Date: Dec. 15, 2022

(65) Prior Publication Data
US 2024/0282076 A1     Aug. 22, 2024

(30) Foreign Application Priority Data
Jun. 7, 2021     (DE) ..................... 10 2021 114 555.4

(51) Int. Cl.
*G06V 10/46* (2022.01)
*G06V 10/762* (2022.01)
(Continued)

(52) U.S. Cl.
CPC .......... *G06V 10/462* (2022.01); *G06V 10/762* (2022.01); *G06V 10/7715* (2022.01); *G06V 10/82* (2022.01)

(58) Field of Classification Search
CPC ............... G06V 10/462; G06V 10/762; G06V 10/7715; G06V 10/82; G06V 20/35; G06V 20/50
See application file for complete search history.

(56) References Cited

U.S. PATENT DOCUMENTS

| | | | | |
|---|---|---|---|---|
| 12,100,192 B2 * | 9/2024 | Bai | ...................... | G06N 3/0464 |
| 2023/0118864 A1 * | 4/2023 | Zhang | ................... | G06V 10/26 |
| | | | | 382/103 |

OTHER PUBLICATIONS

Arandjelovic Relja et al: "NetVLAD: CNN Architecture for Weakly Supervised Place Recognition", 2016 IEEE Conference on Computer Vision and Pattern Recognition (CVPR), IEEE, Jun. 27, 2016 (Jun. 27, 2016), pp. 5297-5307.

(Continued)

*Primary Examiner* — Utpal D Shah
(74) *Attorney, Agent, or Firm* — PdZ Patent Law, PLLC

(57) ABSTRACT

In order to improve visual place recognition, a computer implemented method for determining an image descriptor (V(X)) is provided. The method comprises the steps of: a) clustering features from a feature map (18) into a plurality of feature clusters by determining for each feature an inter-cluster weight ($\alpha$); b) for each feature cluster obtained in step a), determining and assigning an intra-cluster saliency weight ($\beta$) to each feature that is associated with said feature cluster; and c) determining the image descriptor (V(X)) based on the inter-cluster weight ($\alpha$) and the intra-cluster saliency weight ($\beta$).

15 Claims, 1 Drawing Sheet

(51) Int. Cl.
G06V 10/77 (2022.01)
G06V 10/82 (2022.01)

(56) References Cited

OTHER PUBLICATIONS

Lowry Stephanie et al: "Visual Place Recognition: A Survey", IEEE Transactions on Robotics, IEEE Service Center, Piscataway, NJ, US, vol. 32, No. 1, Feb. 1, 2016 (Feb. 1, 2016), pp. 1-19.
Chen Zeta() et al: "Deep learning features at scale for visual place recognition", 2017 IEEE International Conference on Robotics and Automation (ICRA), IEEE, May 29, 2017 (May 29, 2017), pp. 3223-3230.

* cited by examiner

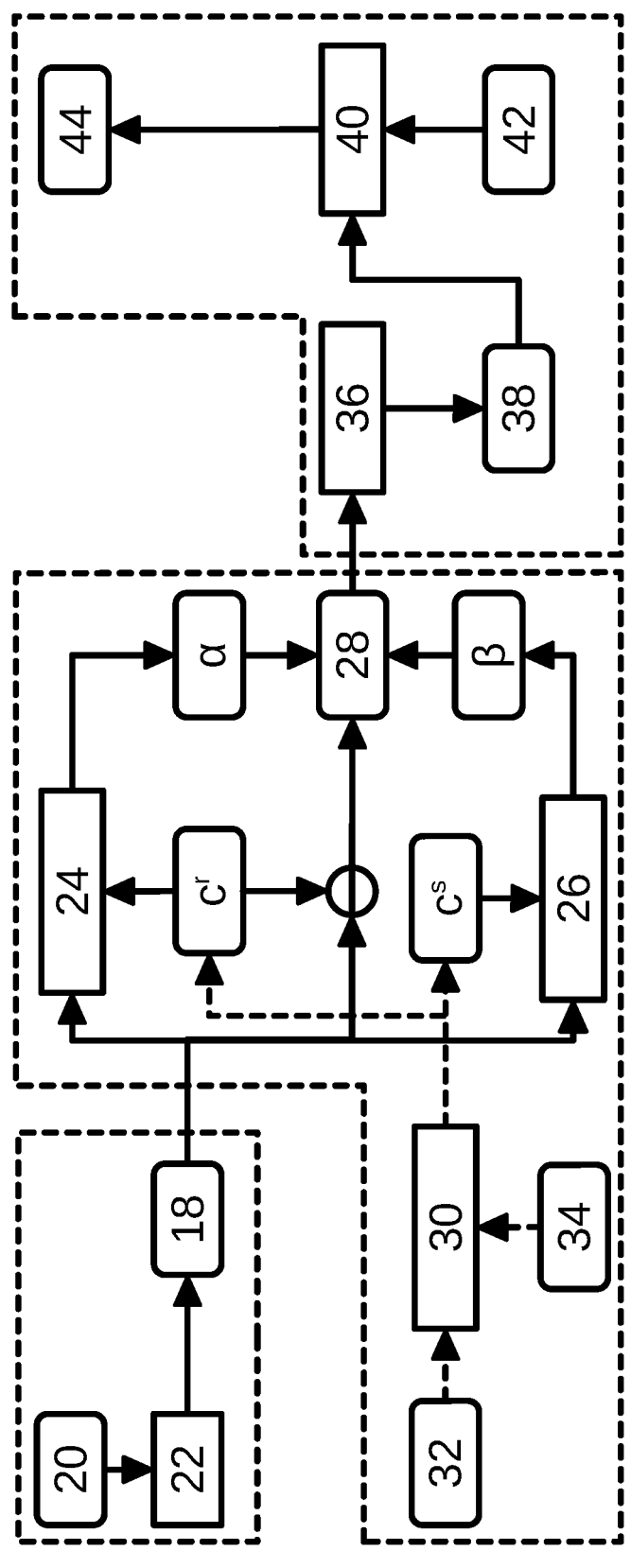

METHOD FOR DETERMINING AN IMAGE DESCRIPTOR, ENCODING PIPELINE, AND VISUAL PLACE RECOGNITION METHOD

The invention relates to a method for determining an image descriptor and an encoding pipeline. The invention further relates to a visual place recognition method and related systems and methods.

Visual place recognition (VPR) is a core technique of many promising applications in the field of computer vision and robotics, such as autonomous driving, geolocalization, 3D reconstruction and virtual reality.

However, the task has always been difficult mainly due to the following challenges. Firstly, as scenes in city-scale environment are always composed of similar entities (buildings, roads, vegetation) with consistent spatial layouts, the embedded descriptors should be able to characterize local details and distinguish subtle differences. Moreover, the same place may undergo significant variations in appearance due to season and weather changes. Background clutters and partial occlusions also add up to the task difficulty. For the above challenges, formulating robust image representation turns out to be the core of the VPR task.

Over the past decades, many attempts have been made to formulate powerful image representations, among which aggregation-based methods have emerged as a big advancement. Typical approaches range from methods using a vector of locally aggregated descriptors (VLAD) to recent convolutional neural network (Convnet) architectures that introduce multiple pooling strategies.

However, not all visual cues in the image are task-relevant. Early methods quantify all local features indiscriminately, where misleading information is encoded into the image representation.

The recent attention aware methods can be categorized as either data-driven or rule-based. The data-driven methods simply employ an attention mechanism as the black box weighting of local features, which lacks the interpretability to reflect priors. The rule-based methods typically use semantic information to filter specific visual cues, while their performance is limited by prior knowledge and the generalization ability of the semantic segmentation algorithm. Therefore, there is a need to set up an interpretable attention module which can benefit from both prior knowledge and data-driven learning.

It is the object of the invention to improve visual place recognition (VPR) methods.

The object is achieved by the subject-matter of the independent claims. Preferred embodiments are subject-matter of the dependent claims.

The invention provides a computer implemented method for determining an image descriptor for use in visual place recognition, the method comprising:
- a) clustering features from a feature map into a plurality of feature clusters by determining for each feature an inter-cluster weight;
- b) for each feature cluster obtained in step a), determining and assigning an intra-cluster saliency weight to each feature that is associated with said feature cluster; and
- c) determining the image descriptor based on the inter-cluster weight and the intra-cluster saliency weight.

It is preferred, that in step a) the features to be clustered are extracted from an input image by means of a convolutional neural network.

It is preferred, that in step a) the features are clustered using a partitional clustering method, a k-means clustering method, and/or a soft-assignment.

It is preferred, that in step b) a Voronoi cell of at least one feature cluster is separated into an informative portion, that is represented by a representative centroid that is representative of said cluster, and at least one ambiguous portion, that is represented by a shadow centroid.

It is preferred, that the intra-cluster saliency weight is determined such that the intra-cluster saliency weight indicates a probability of a feature being located in the informative portion.

It is preferred, that in step b) a feature determined to be located in the ambiguous portion is assigned a lower intra-cluster saliency weight compared to a featured determined to be located in the informative portion.

It is preferred, that in step b), for each feature cluster, the at least one shadow centroid is initialized based on at least one top candidate that has the closest Euclidean distance from the representative centroid.

It is preferred, that in step c) an attentional pyramid pooling module is used for highlighting local residuals of informative areas.

It is preferred, that in step c) the feature map is divided into a plurality of multi-scale regions by a pyramid structure having at least one pyramid level, wherein at least one regional feature of the pyramid level is determined by aggregating salient cluster-wise residuals within a spatial grid that are weighted with the inter-cluster weight and the intra-cluster saliency weight.

It is preferred, that a contribution of each regional feature to a feature embedding of each feature cluster is determined according to a relative spatial saliency value that is determined based on a distinctiveness value calculated by a convolutional layer that is configured to evaluate a distinctiveness of each spatial region.

It is preferred, that for each feature cluster a visual word vector is generated from the feature embedding by aggregating the regional features weighted by their respective spatial saliency value.

It is preferred, that the image descriptor is generated by normalizing the visual word vector for each feature cluster, rescaling each normalized visual word vector with training weights, and concatenating the rescaled normalized visual word vectors to form the image descriptor.

The invention provides a method for visual place recognition the method comprising:
- a) recording an image of a scene and determining a feature map of the scene;
- b) performing a preferred method for determining an image descriptor with the feature map of the scene, so as to obtain an image descriptor;
- c) comparing the image descriptor with reference images stored in a data storage and, if an image matching the image descriptor is found, generate a control signal that causes another device, preferably a vehicle, to perform an action based on the control signal.

The invention provides a vehicle having an image sensor configured for recording a scene, a visual place recognition device that is configured for performing a preferred method, so as to obtain a control signal, and a control unit that is configured to process the control signal and perform some action indicated by the control signal.

The invention provides a computer program, a machine readable storage medium, or a data signal that comprises instructions that, upon execution on a data processing device, cause the device to perform one, some, or all of the steps of a method according to any of the preceding claims.

Herein, we propose a novel attentional encoding strategy for VPR. Particularly, we propose three types of attention modules to model the saliency of local features in individual, spatial and cluster dimensions, respectively. Incorporating the triple attention, our model can adaptively identify and embed salient visual cues into a discriminative image descriptor.

To fill the gap between the thoroughly data-driven or rule-based attentional methods, we construct an interpretable attention module for local feature refinement. Reinforced by a novel semantic constrained initialization, it can reflect semantic priors with the initial weights of the parametric model. Through further fine-tuning, the ultimate inferred attention can benefit from both prior knowledge and data-driven learning. Additionally, we incorporate the spatial and cluster saliency in feature embedding, which makes our representation more robust against the challenges encountering in city-scale visual place recognition.

Deep local features are first extracted and clustered into K visual word clusters through a soft-assignment:

$$\alpha_k(x_i) = \frac{e^{-a\|x_i - c_k^r\|^2}}{\sum_{j=1}^{K} e^{-a\|x_i - c_k^r\|}} \qquad \text{Equation (1)}$$

To further suppress task-irrelevant features in each cluster, we propose a local weighting scheme based on the intra-cluster feature distribution. As local features should mostly gather together in line with semantics and appearance, we assume the Voronoi cell of a cluster can be separated into an informative area and various ambiguous areas.

Each ambiguous area can be represented by a shadow centroid. The intra-cluster saliency weight $\beta_k$ is defined as the probability of a local feature from the k-th cluster being located in the informative area. Assuming that sub-clusters are uniformly distributed and each one conforms to a Gaussian with equal variance matrix. The probability $\beta_k(x_i)$ can be derived through the Bayesian theorem:

$$\beta_k(x_i) = \frac{e^{-a\|x_i - c_k^r\|^2}}{\sum_{l=1}^{S} e^{-a\|x_i - c_{kl}^s\|^2} + e^{-a\|x_i - c_k^r\|^2}} \qquad \text{Equation (2)}$$

According to this equation, local features originated from ambiguous areas will be assigned lower saliency weights than features originated from the informative area. To equivalently provide better initial attention $\beta_k$ for the local weighting scheme, we propose semantic constrained initialization, which uses semantics as the constraints for initializing $c^r$ and $c^s$.

Specifically, features labeled as static objects, such as "building", "road", "traffic signs", "vegetation", and the like, are filtered and sampled for generating a number of K representative centroids. While those dynamic or task-irrelevant semantics, such as "sky", "person", "vehicle", and the like, are used for generating a number of N shadow candidates. For each cluster, the S shadow centroids are initialized by the top S candidates that have closest Euclidean distances with the representative centroid.

The semantic constrained initialization essentially partitions the encoding space based on semantic priors, which equivalently provides better initial attention for the local weighting scheme. On this basis, we allow the network to fit the optimal attention through end-to-end training. Thereby, the ultimate local attention can benefit from the mutual promotion between semantic priors and data-driven learning.

We propose an attentional pyramid pooling module to highlight the local residuals of informative areas when generating visual word vectors. Specifically, an overlapping pyramid structure is first employed to divide the feature maps into multi-scale regions. Let $f_k^{n,m}$ be the the m-th regional feature at the n-th pyramid level. It can be obtained by aggregating the salient cluster-wise residuals within the spatial grid as follows:

$$f_k^{n,m} = \sum_{i=0}^{H_{grid} W_{grid}} \alpha_k(x_i)\beta_k(x_i)(x_i - c_k^r) \qquad \text{Equation (3)}$$

Since not all regional features describe the informative area, a spatial attention block is introduced to adjust their contribution to feature embedding. At each pyramid level, a convolutional layer with the same kernel size and stride as the sliding window is employed to evaluate the distinctiveness of each spatial region. Then the multi-scale regional features and their distinctiveness $\mu_k^{n,m}$ are stacked as $f_k = [f_k^{1,1} \ldots f_k^{n,m} \ldots f_k^{N,4N-1}]$ and $\mu_k = [\mu_k^{1,1} \ldots \mu_k^{n,m} \ldots \mu_k^{N,4N-1}]$ respectively.

The relative spatial saliency $\tilde{\mu}_k$ is calculated by L2-normalizing the $\mu_k$, so that each element $\tilde{\mu}_k^{n,m}$ is related to the global context. Finally, as in the following equation, the k-th visual word vector $V_k$ is generated by aggregating the multi-scale regional features weighted by their relative spatial saliency.

$$V_k = f_k^T \tilde{\mu}_k \sum_{n=1}^{N} \sum_{m=1}^{4^{n-1}} \tilde{\mu}_k^{n,m} f_k^{n,m} \qquad \text{Equation (4)}$$

We propose a parametric normalization, where trainable parameter $\gamma_k$ is introduced to quantify the importance of the k-th visual cluster to the final image representation. In implementation, the trainable weights $\gamma_k = [\gamma_1, \gamma_2, \ldots, \gamma_K]$ are first L2-normalized as the cluster saliency $\tilde{\gamma}_k = [\tilde{\gamma}_1, \tilde{\gamma}_2, \ldots, \tilde{\gamma}_K]$. Then a unit image descriptor can be generated by concatenating the normalized visual word vectors $V_k$ rescaled by their corresponding cluster saliency $\tilde{\gamma}_K$.

$$V(X) = [\tilde{\gamma}_1 \cdot \tilde{V}_1(X), \tilde{\gamma}_2 \cdot \tilde{V}_2(X), \ldots, \tilde{\gamma}_K \cdot \tilde{V}_K(X)] \qquad \text{Equation (5)}$$

We first conduct experiments on city-scale benchmark datasets, namely Pittsburgh and Tokyo™, which demonstrates that our proposed method called APPSVR outperforms existing methods and achieves a significantly better performance on both datasets. Then we evaluate our method on our own collected datasets, namely Northispine, NanyangLink, and Nanyang Height, where our method shows more stable loop closure detection performance than all other baseline methods.

Additionally, the visualization of the learned attention of APPSVR is largely consistent with human cognition, which highlights long-term static objects while suppressing misleading ones.

Overall, one can come up with a conclusion that APPSVR is able to cope with the practical challenges that may be encountered in city-scale visual place recognition.

Embodiments of the invention are described in more detail with reference to the accompanying schematic drawings.

FIG. 1 depicts an embodiment of an encoding pipeline according to the invention.

FIG. 1 depicts an example of an encoding pipeline 10 for visual place recognition. The encoding pipeline 10 includes a feature extraction module 12, a local refinement module 14, and a global integration module 16.

The feature extraction module 12 is configured to determine a feature map 18 from an input image 20. The feature extraction module 12 includes a convolutional neural network 22 that processes the input image 20 and outputs the feature map 18. The feature map 18 is passed on to the local refinement module 14 for further processing.

The local refinement module 14 includes a clustering module 24. The clustering module 24 is configured to cluster features contained in the feature map 18 using a partitional clustering method, such as k-means clustering with a soft-assignment pursuant to Equation (1). As a result, the clustering module 24 outputs at least one feature cluster that is defined by a representative centroid $c^r$ and an inter-cluster weight $\alpha$ (also called soft-assignment weights) that is associated with each feature.

The local refinement module 14 includes a local clustering module 26. The local clustering module 26 is configured to separate the Voronoi cell of the corresponding feature cluster determined by the clustering module 24 into one informative portion and at least one ambiguous portion. Each ambiguous portion is defined by a shadow centroid $c^s$. The probability of a feature belonging to the informative portion is called the intra-cluster saliency weight $\beta$ and is calculated based on the representative centroid $c^r$ and the shadow centroids $c^s$ according to Equation (2).

The local refinement module 14 includes a local residual determining module 28. The local residual determining module 28 is configured to determine the local residual associated with each feature and passes them on to the global integration module 16 for further processing. The residuals are determined in a manner known per se.

The local refinement module 14 includes a semantic initialization module 30 that is configured to determine the initial guesses for the representative and shadow centroids $c^r$, $c^s$, respectively, based on semantic priors 32 and sampled local features 34.

The semantic initialization module 30 generates a number of K representative centroids $c^r$ based on features that are labeled as a static object, such as 'building', 'road', 'traffic signs' and 'vegetation'. Thus, the term static objects may designate in general features that do not change very much in a city-like environment. For example, a particular building may be under construction or renovation, but that does not change the characterization as a building. Also traffic signs may change over time, but significantly slower compared to traffic patterns, pedestrians, and the like. The vegetation may change during the seasons, but the fact that it is vegetation does not change.

The semantic initialization module 30 also generates a number of S shadow centroids $c^s$ that are selected from a list of N shadow candidates. For example, the top S shadow candidates of the list of N shadow candidates are selected for initializing the S shadow centroids $c^s$. Shadow centroids cs are initialized for dynamic or task-irrelevant semantics, which in a city context can be 'sky', 'person', 'vehicle', and the like. In general dynamic semantics are the ones that change frequently in a city-like environment but are not indicative of a particular location within a city-like environment since they can change city wide during the course of the day.

As a result, the semantic initialization module 30 enables the encoding pipeline 10 to partition the encoding space based on semantic priors. Hence, the system can be trained using end-to-end training to allow for optimal attention.

The global integration module 16 includes an attentional pyramid pooling module 36 that is configured to generate visual word vectors. When the visual word vectors are generated, the local residuals of informative portions are also highlighted. The attentional pyramid pooling module 36 includes an overlapping pyramid structure. The attentional pyramid pooling module 36 is divides the feature maps 18 into multi-scale regions and determines regional features $f_k^{n,m}$ according to Equation (3).

The attentional pyramid pooling module 36 includes a spatial attention block module that is configured to adjust the contribution of each regional feature $f_k^{n,m}$ to the feature embedding. The attentional pyramid pooling module 36 has for each of its pyramid layers a convolutional layer. The kernel size and stride is equal to the sliding window, so as to evaluate the distinctiveness of each spatial region.

The attentional pyramid pooling module 36 stacks the regional features $f_k^{n,m}$ and their corresponding distinctiveness $\mu_k^{n,m}$. From the distinctiveness $\mu_k^{n,m}$ a relative spatial saliency can be calculated by L2-normalizing the distinctiveness vector $\mu_k$. From that the k-th visual word vector $V_k$ associated with the k-th feature cluster is calculated by aggregating the regional features $f_k^{n,m}$ weighted by their relative spatial saliency according to Equation (4).

The global integration 16 includes a parametric normalization module 38 that is configured to determine an image descriptor V(X) by concatenating normalized visual word vectors and scaling them by an L2-normalize cluster saliency according to Equation (5). The normalized cluster saliency is obtained from a set of trainable weights $\gamma$.

The applicants have conducted experiments on city-scale benchmark datasets, namely Pittsburgh and Tokyo™, which demonstrates that the method APPSVR outperforms existing methods and achieves a significantly better performance on both datasets.

Then we evaluate our method on our own collected datasets, namely Northispine, NanyangLink, and Nayang Height, where our method shows more stable loop closure detection performance than all other baseline methods.

The learned attention of APPSVR is largely consistent with human cognition, which highlights long-term static objects while suppressing misleading ones. Overall, one can come up with a conclusion that APPSVR is able to cope with the practical challenges that may be encountered in city-scale visual place recognition.

The results of the experiments and example retrievals on the Tokyo 24/7 dataset are incorporated by reference and attached to this application.

REFERENCE SIGNS 10 encoding pipeline
12 feature extraction module
14 local refinement module
16 global integration module
18 feature map
20 input image
22 convolutional neural network
24 clustering module
26 local clustering module

28 local residual determining module
30 semantic initialization module
32 semantic priors
34 sampled local features
36 attentional pyramid pooling module
$c^r$ representative centroid
$c^s$ shadow centroid
$f_k^{n,m}$ regional feature
V(X) image descriptor
$V_k$ k-th visual word vector
$\alpha$ inter-cluster weight
$\beta$ intra-cluster saliency weight
$\gamma$ trainable weights
$\mu_k^{n,m}$ distinctiveness

The invention claimed is:

1. A computer implemented method for determining an image descriptor (V(X)) for use in visual place recognition, the method comprising:
   a) clustering features from a feature map (18) into a plurality of feature clusters by determining for each feature an inter-cluster weight ($\alpha$);
   b) for each feature cluster obtained in step a), determining and assigning an intra-cluster saliency weight ($\beta$) to each feature that is associated with said feature cluster; and
   c) determining the image descriptor (V(X)) based on the inter-cluster weight ($\alpha$) and the intra-cluster saliency weight ($\beta$).

2. The method according to claim 1, characterized in that, in step a) the features to be clustered are extracted from an input image (20) by means of a convolutional neural network (22).

3. The method according to claim 1, characterized in that, in step a) the features are clustered using a partitional clustering method, a k-means clustering method, and/or a soft-assignment.

4. The method according to claim 1, characterized in that, in step b) a Voronoi cell of at least one feature cluster is separated into an informative portion, that is represented by a representative centroid (cr) that is representative of said cluster, and at least one ambiguous portion, that is represented by a shadow centroid (cs).

5. The method according to claim 4, characterized in that, the intra-cluster saliency weight ($\beta$) is determined such that the intra-cluster saliency weight ($\beta$) indicates a probability of a feature being located in the informative portion.

6. The method according to claim 4, characterized in that, in step b) a feature determined to be located in the ambiguous portion is assigned a lower intra-cluster saliency weight ($\beta$) compared to a feature determined to be located in the informative portion.

7. The method according to claim 4, characterized in that, in step b), for each feature cluster, the at least one shadow centroid (cs) is initialized based on at least one top candidate selected from the at least one ambiguous portion that has the closest Euclidean distance from the representative centroid (cr).

8. The method according to claim 1, characterized in that, in step c) an attentional pyramid pooling module (36) is used for highlighting local residuals of informative portions, and the feature map (18) is divided into a plurality of multi-scale regions by a pyramid structure having at least one pyramid level, wherein at least one regional feature (fkn,m) of the pyramid level is determined by aggregating salient cluster-wise residuals within a spatial grid that are weighted with the inter-cluster weight ($\alpha$) and the intra-cluster saliency weight ($\beta$).

9. The method according to claim 8, characterized in that, a contribution of each regional feature (fkn,m) to a feature embedding of each feature cluster is determined according to a relative spatial saliency value that is determined based on a distinctiveness value ($\mu$kn,m) calculated by a convolutional layer that is configured to evaluate a distinctiveness of each spatial region.

10. The method according to claim 9, characterized in that, for each feature cluster a visual word vector (Vk) is generated from the feature embedding by aggregating the regional features (fkn,m) weighted by their respective spatial saliency value ($\mu$kn,m).

11. The method according to claim 10, characterized in that, the image descriptor (V(X)) is generated by normalizing the visual word vector (Vk) for each feature cluster, rescaling each normalized visual word vector with training weights ($\gamma$), and concatenating the rescaled normalized visual word vectors to form the image descriptor (V(X)).

12. An encoding pipeline (10) for determining an image descriptor (V(X)) from an input image (20), the encoding pipeline (10) comprising a feature extraction module (12) configured to perform step a) of the method according to claim 1, a local refinement module (14) that is configured for performing step b) of the method according to claim 1, and a global integration module (16) configured for performing step c) of the method according to claim 1.

13. A method for visual place recognition, the method comprising:
   a) recording an image of a scene and determining a feature map (18) of the scene;
   b) performing a method according to claim 1 with the feature map (18) of the scene, so as to obtain an image descriptor (V(X)); and
   c) comparing the image descriptor (V(X)) with reference images stored in a data storage and, in response to an image matching the image descriptor (V(X)) being found, generating a control signal that causes another device.

14. A vehicle, comprising:
   an image sensor configured for recording an image of a scene; and
   a visual place recognition device that is configured for performing the method according to claim 13, so as to obtain a control signal; and
   a control unit that is configured to process the control signal and perform an action indicated by the control signal.

15. A non-transitory machine readable storage medium comprising instructions that, upon execution on a data processing device, cause the device to perform at least one of the steps of the method according to claim 1.

* * * * *